(12) United States Patent
Kang et al.

(10) Patent No.: US 12,095,138 B2
(45) Date of Patent: Sep. 17, 2024

(54) CLAMPING APPARATUS FOR ANTENNA

(71) Applicant: KMW INC., Hwaseong-si (KR)

(72) Inventors: Seong Man Kang, Hwaseong-si (KR);
Hyoung Seok Yang, Hwaseong-si (KR); In Ho Kim, Yongin-si (KR); Dae Myung Park, Hwaseong-si (KR); Su Yong Lee, Seoul (KR)

(73) Assignee: KMW INC., Hwaseong-si (KR)

( * ) Notice: Subject to any disclaimer, the term of this patent is extended or adjusted under 35 U.S.C. 154(b) by 153 days.

(21) Appl. No.: 17/565,548

(22) Filed: Dec. 30, 2021

(65) Prior Publication Data
US 2022/0123455 A1    Apr. 21, 2022

Related U.S. Application Data

(63) Continuation of application No. PCT/KR2020/008501, filed on Jun. 30, 2020.

(30) Foreign Application Priority Data

Jul. 5, 2019   (KR) .................. 10-2019-0081201
Feb. 20, 2020  (KR) .................. 10-2020-0020995

(51) Int. Cl.
*H01Q 1/12*      (2006.01)
(52) U.S. Cl.
CPC ......... *H01Q 1/1264* (2013.01); *H01Q 1/1228* (2013.01)
(58) Field of Classification Search
CPC .............. H01Q 1/1264; H01Q 1/1228; F16M 13/022; E04H 12/2276; E04H 12/2292; E04H 12/24

(Continued)

(56) References Cited

U.S. PATENT DOCUMENTS 3,976,273 A *  8/1976  Kussow ................... A47C 9/04
                                                     248/218.4
5,161,561 A * 11/1992  Jamieson ............... A45B 23/00
                                                     248/156

(Continued)

FOREIGN PATENT DOCUMENTS

CN    106329059 A    1/2017
JP    06-044213 U    6/1984

(Continued)

OTHER PUBLICATIONS

Machine translation of applicant cited JP2003152409; Matsushita Electric (Year: 2003).*

(Continued)

*Primary Examiner* — Ingrid M Weinhold
(74) *Attorney, Agent, or Firm* — Insight Law Group, PLLC; Seung Lee

(57) ABSTRACT

The present invention relates to a clamping apparatus for an antenna and, particularly, to a clamping apparatus for an antenna, comprising: an arm unit which is coupled to a support pole vertically provided in the up-and-down direction and extends in the horizontal direction with respect to the support pole; a clamping unit having one end provided with an antenna device and the other end coupled to the distal end of the arm unit, wherein the clamping unit is provided to be rotatable leftward and rightward or to be tiltable upward and downward, so as to rotate the antenna device; and a rotation-auxiliary mounting unit coupled onto the support pole corresponding to the lower part of the arm unit, wherein when a rotation angle of the arm unit is changed, the rotation-auxiliary mounting unit rotatably supports the arm unit in the rotation direction of the arm unit while supporting the weights of the arm unit and the antenna device. Therefore, the clamping apparatus enables easy (Continued)

installation of the antenna device by an individual installer and easy direction adjustment thereof.

12 Claims, 8 Drawing Sheets

(58) Field of Classification Search
USPC ......... 248/218.4, 219.3–219.4, 230.3, 230.5, 248/125.7, 289.11
See application file for complete search history.

(56) References Cited

U.S. PATENT DOCUMENTS

| | | | | |
|---|---|---|---|---|
| 5,641,141 | A * | 6/1997 | Goodwin | H01Q 1/12 |
| | | | | 343/879 |
| 6,211,845 | B1 | 4/2001 | Cook et al. | |
| 6,262,691 | B1 * | 7/2001 | Austin | H01Q 1/1228 |
| | | | | 343/890 |
| 6,512,492 | B2 * | 1/2003 | Overton | H01Q 3/08 |
| | | | | 343/882 |
| 6,664,937 | B2 * | 12/2003 | Vermette | H01Q 1/1228 |
| | | | | 343/882 |
| 8,020,823 | B2 * | 9/2011 | Wang | F16M 13/02 |
| | | | | 248/278.1 |
| 9,184,489 | B2 * | 11/2015 | Lin | H01Q 1/1264 |
| 11,592,141 | B2 * | 2/2023 | Brandt | F16C 11/0685 |
| 2003/0089830 | A1 * | 5/2003 | Loughman | F16M 11/10 |
| | | | | 248/125.7 |
| 2009/0267860 | A1 * | 10/2009 | Peng | H01Q 1/1228 |
| | | | | 343/878 |
| 2016/0211576 | A1 | 7/2016 | Vassilakis | |
| 2016/0365618 | A1 * | 12/2016 | Kim | H01Q 1/1242 |

FOREIGN PATENT DOCUMENTS

| | | |
|---|---|---|
| JP | 01-057420 U | 4/1989 |
| JP | 02-135807 A | 5/1990 |
| JP | 07-307606 A | 11/1995 |
| JP | 09-232831 A | 9/1997 |
| JP | H10-22713 A | 1/1998 |
| JP | 2001-177323 A | 6/2001 |
| JP | 2003-152409 A | 5/2003 |
| KR | 10-2003-0069260 A | 8/2003 |
| KR | 10-0888259 B1 | 3/2009 |
| KR | 10-2009-0039298 A | 4/2009 |
| KR | 2009-0039298 A | 4/2009 |
| KR | 10-2009-0078608 A | 7/2009 |
| KR | 20-0450496 A | 10/2010 |
| KR | 10-1440927 A | 9/2014 |

OTHER PUBLICATIONS

International Search Report mailed Oct. 8, 2020 for International Application No. PCT/KR2020/008501 and its English translation.
Non-final office action mailed May 20, 2022 from the Indian Intellectual Property Office for Indian Application No. 202217002282.
Extended European Search Report mailed Jul. 13, 2023 from the European Patent Office for European Application No. 20836156.8.

* cited by examiner (a)            (b)

CLAMPING APPARATUS FOR ANTENNA

CROSS-REFERENCE TO RELATED APPLICATIONS

This application is a Continuation of International Application No. PCT/KR2020/008501, filed on Jun. 30, 2020, which claims the benefit of and priority to Korean Patent Application Nos. 10-2019-0081201, filed on Jul. 5, 2019; and 10-2020-0020995, filed on Feb. 20, 2020, the disclosure of which are herein incorporated by reference in their entirety.

TECHNICAL FIELD

The present disclosure relates to a clamping apparatus for an antenna, and more particularly, to a clamping apparatus for an antenna, which can effectively adjust the directivity of an antenna within a wide range and a narrow range on a support pole even without being fully separated from the support pole while supporting the gross weight of an antenna device, a clamping part for connecting the antenna device, and an arm unit.

BACKGROUND ART

A wireless communication technology, for example, a multiple input multiple output (MIMO) technology is a technology which significantly increases a data transmission capacity by using multiple antennas, and is a spatial multiplexing scheme in which a transmitter transmits different data through transmission antennas and a receiver distinguishes between transmission data through proper signal processing.

Accordingly, as the numbers of transmission and reception antennas are simultaneously increased, more data can be transmitted because a channel capacity is increased. For example, if the number of antennas is increased to 10, about 10 times a channel capacity can be secured using the same frequency band compared to a current single antenna system.

In 4G LTE-advanced, up to 8 antennas are used. In a current pre-5G stage, a product on which 64 or 128 antennas are mounted is being developed. In 5G, it is expected that base station equipment having far more antennas will be used, which is called a massive MIMO technology. A current cell operation is a two dimension. In contrast, if the massive MIMO technology is introduced, 3D-beamforming is made possible, which is also called full dimension (FD)-MIMO.

In the massive MIMO technology, as the number of antennas (ANT) is increased, the numbers of transmitter and filters are also increased. Nevertheless, due to a lease cost for an installation place or spatial restriction, RF parts (antenna/filter/power amplifier/transceiver, etc.) are practically manufactured to be small, lightweight and cheap. The massive MIMO requires a high output in order to extend coverage. Consumption power and the amount of heat generated attributable to such a high output act as a negative factor in reducing weight and a size.

In particular, when a MIMO antenna with which modules having RF elements and digital elements embodied therein are coupled as a stack structure is installed in a limited space, in order to maximize installation easiness or space utilization, the necessity for a compactness and downsizing design for a plurality of layers constituting the MIMO antenna is emerging, and there is a strong demand for the necessity regarding freely adjusting the direction of an antenna apparatus installed in one support pole.

Although an antenna device is manufactured due to the necessity for such a compactness and downsizing design, the weight of the antenna device itself and the weight of a clamping apparatus for an antenna for installing and fixing the antenna device are relatively great. A lot of manpower is necessary when the antenna device is installed in a support pole or the directivity of a previously installed antenna device is adjusted.

DISCLOSURE

Technical Problem

The present disclosure has been made to solve the aforementioned problems, and an object of the present disclosure is to provide a clamping apparatus for an antenna, which is provided to support, on a support pole, the rotation of the entire arm unit with which an antenna device has been coupled, thereby enabling one installer to easily adjust the directivity of the antenna device.

Furthermore, another object of the present disclosure is to provide a clamping apparatus for an antenna, which is provided to enable the directivity of an antenna device to be adjusted in a wide range by rotating and fixing an arm unit itself at a desired location by primarily using a rotation assist mounting part and to enable the directivity of the antenna device to be adjusted in a narrow range by secondarily using a tilting unit.

Objects of the present disclosure are not limited to the aforementioned object, and the other objects not described above may be evidently understood from the following description by those skilled in the art.

Technical Solution

An embodiment of a clamping apparatus for an antenna according to the present disclosure includes an arm unit coupled with a perpendicularly provided support pole in a way to extend in a direction horizontal to the support pole, a clamping part having one end provided with an antenna device and another end coupled with a front end of the arm unit, provided to be left and right rotatable or to be up and down tiltable and rotatable, and configured to rotate the antenna device, and a rotation assist mounting part coupled on the top of the support pole corresponding to the bottom of the arm unit and configured to rotatably support a weight of the arm unit and the antenna device when a rotation angle of the arm unit is changed.

In this case, the arm unit may include an arm main body configured to extend in a given length in a horizontal direction on any one of one side and another side of the support pole and to have the clamping part installed at a front end thereof, a fixing type bracket integrated and provided at the end of the arm main body on the support pole side and closely attached and disposed on any one of one side and another side of an outer circumference surface of the support pole, and a separation type bracket closely attached and disposed on the another side of the one side and the another side of the outer circumference surface of the support pole on a side opposite to the fixing type bracket with respect to the support pole and coupled with the fixing type bracket by multiple fixing-long bolts and fixing nuts, wherein the rotation assist mounting part may be provided to simultaneously support at least parts of bottoms of the fixing type bracket and the separation type bracket.

Furthermore, the rotation assist mounting part may be formed to have a size that covers at least a semicircle or more of the outer circumference surface of the support pole on a premise that the support pole has a circular horizontal cross section.

Furthermore, the rotation assist mounting part may include a support panel part configured to support a weight of the arm unit, the clamping part and the antenna device, and a rotation support part configured to support the rotation of the arm unit.

Furthermore, the rotation support part may closely attach and support the parts of the bottoms of the fixing type bracket and the separation type bracket of the arm unit.

Furthermore, the support panel part may include a main support panel configured to have a horizontal surface so that the bottoms of the fixing type bracket and separation type bracket of the arm unit are supported, a coupling panel provided at the bottom of the main support panel and configured to have a surface closely attached to a part of the outer circumference surface of the support pole, and a sub-support panel configured to have the top supporting the bottom of the main support panel and a side supporting an outside of the coupling panel.

Furthermore, the sub-support panel may be provided in plural along an outer circumference of the coupling panel.

Furthermore, the rotation assist mounting part may further include a fixing band configured to fix the coupling panel to the support pole.

Furthermore, the fixing band may be closely coupled with the outer circumference surface of the support pole while surrounding a part of the outside of the coupling panel.

Furthermore, the fixing band may be coupled with the coupling panel and the support pole by using any one of a welding coupling method and a fastening method.

Furthermore, at least one band through hole through which the fixing band penetrates from the outside of the coupling panel to an inside thereof may be formed in the coupling panel. At least one band accommodation hole in which the fixing band is accommodated between the sub-support panel and the outside of the coupling panel may be formed in the sub-support panel.

Furthermore, the rotation support part may include a plurality of ball bearing assemblies disposed to protrude upward from the support panel part and isolated from each other at a given distance in a circumferential direction of the support pole.

Furthermore, the ball bearing assembly may include ball accommodation blocks seated in and fixed to rotation part-seated holes, respectively, formed in plural in the main support panel of the support panel part, and bearing balls accommodated in the ball accommodation holes formed in the ball accommodation blocks, respectively, so that a part of an outer circumference surface of each of the bearing balls is exposed to an outside.

Furthermore, wherein the ball bearing assembly may further include a lubricant coated on the inside of the ball accommodation hole and configured to reduce a frictional force when the bearing ball rotates.

Furthermore, a rotation part-seated hole in which the ball accommodation block is seated and assembled may be formed in the main support panel in a way to up and down penetrate the main support panel.

Advantageous Effects

According to an embodiment of the clamping apparatus for an antenna according to the present disclosure, the following various effects can be achieved.

First, there are effects in that a degree of freedom of installation for the support pole having many space restrictions can be increased and the installation of the support pole can be improved.

Second, there is an effect in that a direction characteristic of the antenna device can be improved because the directivity of the antenna device in a narrow range can be adjusted by the tilting unit and the rotation unit and the directivity of the antenna device in a wide range and the directivity of the antenna device in a narrow range can be easily adjusted by rotating and fixing and installing the entire arm unit for the support pole.

Third, there is an effect in that manpower can be reduced because the arm unit itself in which the antenna device has been installed can be easily rotated and fixed on the support pole even without consuming a lot of manpower.

BEST MODE

<Description of Reference Numerals>

Figure 1:
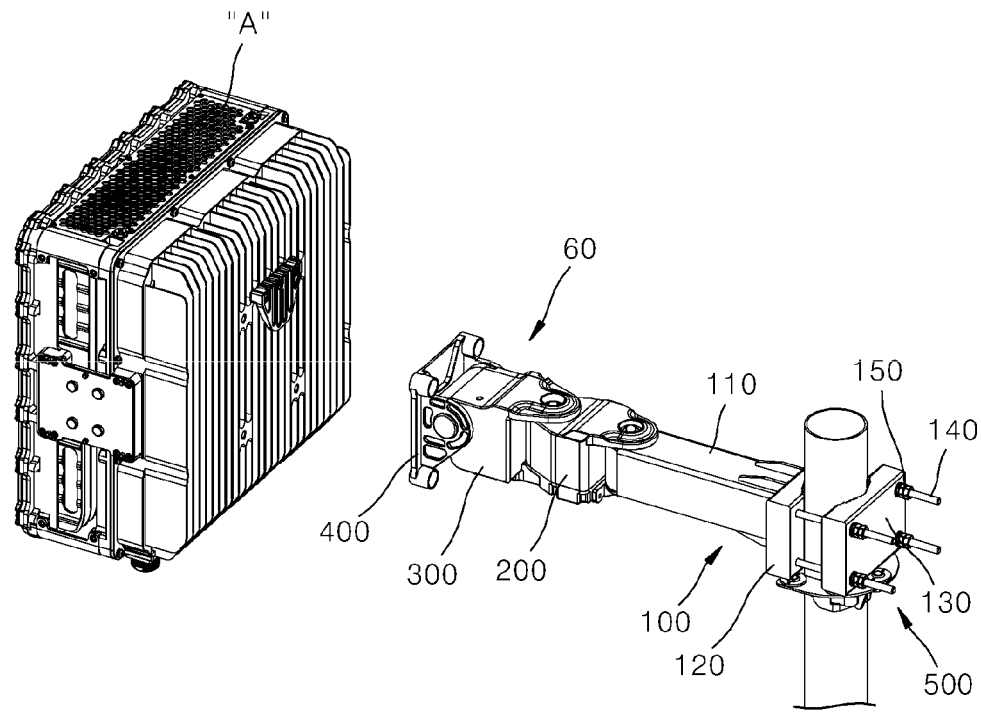
FIG. 1 is a perspective view illustrating the state in which a clamping apparatus for an antenna according to an embodiment of the present disclosure has been installed in a support pole.

| | |
|---|---|
| 100: arm unit | 110: arm main body |
| 120: fixing type bracket | 130: separation type bracket |
| 140: fixing-long bolt | 150: fixing nut |
| 200: common coupling unit | 300: rotation unit |
| 400: tilting unit | 500: rotation assist mounting part |
| 501: support panel part | 510: main support panel |
| 515: rotation part-seated hole | 520: coupling panel |
| 521: band through hole | 530: sub-support panel |
| 531: band accommodation hole | 540: rotation support part |
| 541: ball accommodation block | 542: ball accommodation hole |
| 543: bearing ball | 550: fixing band |
| A: antenna device | |

Hereinafter, a clamping apparatus for an antenna according to an embodiment of the present disclosure is described in detail with reference to the accompanying drawings.

In adding reference numerals to the elements of each drawing, it should be noted that the same elements have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Figure 2:
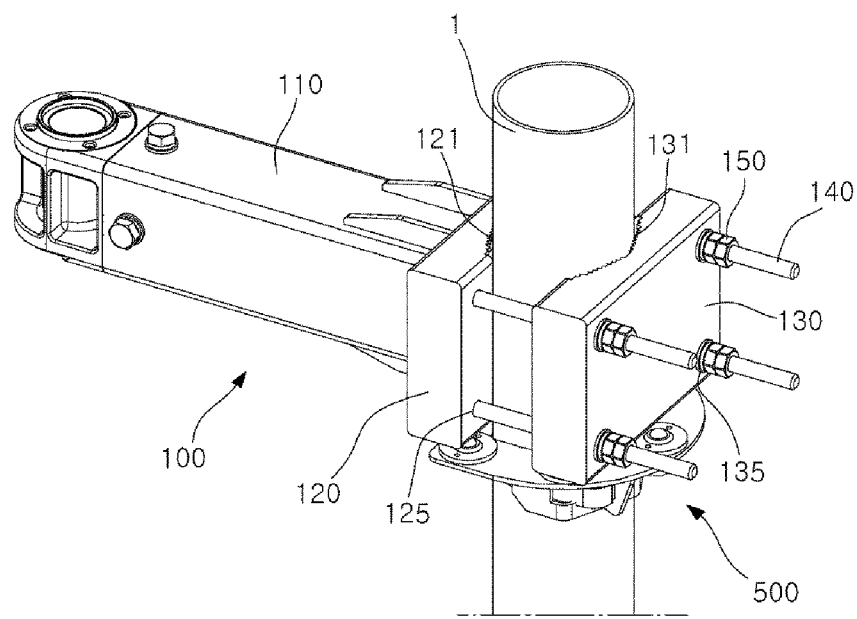
FIG. 2 is a perspective view illustrating the state in which an antenna device and a clamping part have been removed from an arm unit among elements of FIG. 1.
Figure 3:
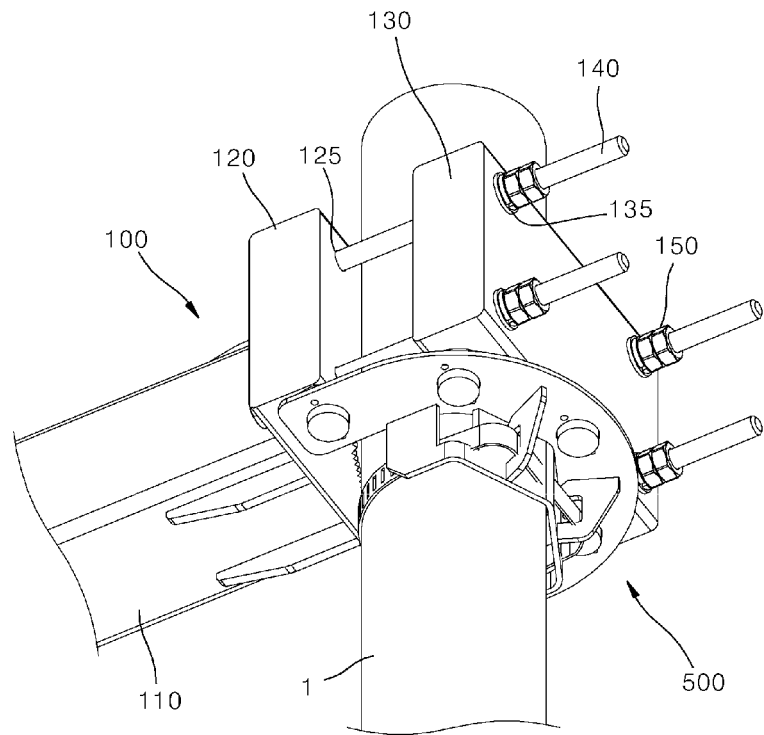
FIG. 3 is a partial upward perspective view of FIGS. 1 and 2.

FIG. 1 is a perspective view illustrating the state in which a clamping apparatus for an antenna according to an embodiment of the present disclosure has been installed in a support pole. FIG. 2 is a perspective view illustrating the state in which an antenna device and a clamping part have been removed from an arm unit among elements of FIG. 1. FIG. 3 is a partial upward perspective view of FIGS. 1 and 2.

As reference is made to FIGS. 1 to 3, the clamping apparatus for an antenna according to an embodiment of the present disclosure includes an arm unit 100 coupled with a support pole 1 provided in a place where an antenna device A is installed, a common coupling unit 200 coupled with a front end of the arm unit 100, and a clamping part 60 provided to be rotatable or tiltable with respect to the common coupling unit 200.

The support pole 1 is installed to upward extend from the place where the antenna device A is installed and sets the installation height of the antenna device A. The arm unit 100 extends to one side and the other side thereof approximately orthogonal to the support pole 1 at a given height on the support pole 1 in a single beam form, and functions to enable multiple antennas devices A to be installed through multiple arm units 100 provided on one support pole 1.

Furthermore, the arm unit 100 may function to adjust the directivity of the antenna device A within a wide range in a direction extending from the support pole 1 having a circular horizontal cross section.

The clamping part 60 is a portion that mediates the coupling of the antenna device A with the arm unit 100. The clamping part 60 is provided to be left and right rotated or up and down tilted and rotated with respect to the front end of the arm unit 100, and functions to adjust the directivity of the antenna device A installed therein within a narrow range.

Accordingly, an installation worker of the antenna device A using the support pole 1 may precisely adjust the directivity of the antenna device A by primarily installing the arm unit 100 on the support pole 1 based on set directivity having a wide range and then secondarily operating the clamping part 60 provided at the front end of the arm unit 100 based on set directivity having a narrow range.

More specifically, as reference is made to FIG. 1, the clamping part 60 includes a rotation unit 300 installed to be left and right rotatable through the medium of a common coupling unit 200 provided at the front end of the arm unit 100, and a tilting unit 400 coupled with a front end of the rotation unit 300 and provided to be up and down tilted and rotatable with respect to the rotation unit 300.

The rotation unit 300 and the tilting unit 400 may be provided to be rotated or tilted and rotated by a manual work of an installer or manager of the antenna device A, or any one of the rotation and the tilting and rotation thereof may be performed by a manual work and the other of the rotation and the tilting and rotation thereof may be automatically performed by a rotating motor (not illustrated) that is electrically driven, or both the rotation and the tilting and rotation thereof may be automatically performed by the rotating motor.

The common coupling unit 200 is an element for a common use of the installation or assembly of the clamping part 60 manufactured according to various specifications, and may be formed in accordance with the rotation unit 300 among the elements of the clamping part 60. That is, the rotation unit 300 is an element coupled with the front end of the arm unit 100 in a way to be rotatable through the medium of the common coupling unit 200. If the common coupling unit 200 is not provided, the rotation unit 300 may be directly coupled with the front end of the arm unit 100 in a way to be rotatable.

Furthermore, the common coupling unit 200 is provided only to function to mediate the coupling of the clamping part 60 unlike the rotation unit 300, but may be provided to selectively left and right rotate around the front end of the arm unit 100 like the rotation unit 300 when additional left and right rotation of the antenna device A is necessary in addition to the left and right rotation of the rotation unit 300.

Accordingly, if the common coupling unit 200 can selectively left and right rotate, there is an advantage in that the range in which the directivity of the antenna device A is adjusted in a narrow range is increased as much as the added rotation range.

As reference is made to FIGS. 1 to 3, the arm unit 100 may include an arm main body 110 which extends in a single beam shape in a given length in a horizontal direction on any one of one side and the other side of the support pole 1 and in which the clamping part 60 is installed at the front end of the arm unit 100, a fixing type bracket 120 integrated and provided at the end of the arm main body 110 on the side of the support pole 1 and closely attached and disposed on any one of one side and the other side of an outer circumference surface of the support pole 1, a separation type bracket 130 closely attached and disposed on the other side of one side and the other side of the outer circumference surface of the support pole 1 on the side opposite to the fixing type bracket 120 on the basis of the support pole 1, and multiple fixing-long bolts 140 and fixing nuts 150 which bolt and couple the fixing type bracket 120 and the separation type bracket 130.

In this case, as reference is made to FIGS. 2 and 3, the fixing-long bolt 140 may penetrate a fixing-side bolt through hole 125 formed in the fixing type bracket 120, may then penetrate a separation-side bolt through hole 135 formed in the separation type bracket 130, and may then be fixed and fastened by the fixing nut 150.

The fixing-side bolt through holes 125 and the separation-side bolt through holes 135 and the fixing-long bolts 140 and the fixing nuts 150 coupled therewith may be provided every four in a way to be fastened to each of edge portions of the fixing type bracket 120 and the separation type bracket 130 formed to have a rectangular vertical cross section.

A fixing-side accommodation groove 121 into which approximately a part of the outer circumference surface of the support pole 1 is inserted and closely attached is formed in a surface of the fixing type bracket 120 corresponding to the support pole 1. The fixing-side accommodation groove 121 may be processed to have a serration shape in a way to not slip downward after being closely attached to the outer circumference surface of the support pole 1 by a fastening force of the fixing-long bolt 140 and the fixing nut 150.

It is natural that the separation-side accommodation groove 131 may also be formed to have a serration shape in the separation type bracket 130 like the fixing-side accommodation groove 121 of the fixing type bracket 120.

The fixing type bracket 120 and separation type bracket 130 of the arm unit 100 are provided approximately in a rectangular block shape, and may be disposed in parallel while being isolated from each other on one side and the other side of the outer circumference surface of the support pole 1, respectively. In this case, the multiple fixing-long bolts 140 connect the fixing type bracket 120 and the separation type bracket 130 in a way to penetrate them through the outside of the support pole 1. The fixing nuts 150 are fastened to ends of the multiple fixing-long bolts 140 exposed to be penetrated to the other side of the separation type bracket 130, and closely attach the fixing type bracket 120 and the separation type bracket 130 toward the outer circumference surface of the support pole 1. In this case, it is preferred that the adherence of the fixing type bracket 120 and the separation type bracket 130 by the fixing-long bolt 140 and the fixing nut 150 is set by taking into consideration the weight of an installed antenna device A and the weight of the arm unit 100 and the common coupling unit 200 and the clamping part 60 coupled with the arm unit.

Meanwhile, conventionally, if the antenna device A is installed with respect to the support pole 1 as described above, there is a problem in that many installers need to be prepared due to the dead weight of the antenna device A, the arm unit 100 and the clamping part 60. Furthermore, even after the antenna device A is installed with respect to the support pole 1, the directivity of the antenna device A may need to be adjusted so that an optimum reception ratio of the antenna device A can be obtained. A problem in that multiple installers need to be dispatched and to perform a work even when the direction of the clamping apparatus for an antenna having a relatively heavy weight according to the present disclosure is set again in each situation is pointed out.

The clamping apparatus for an antenna according to an embodiment of the present disclosure may further include a rotation assist mounting part 500 in order to solve the aforementioned conventional problem.

Figure 4:
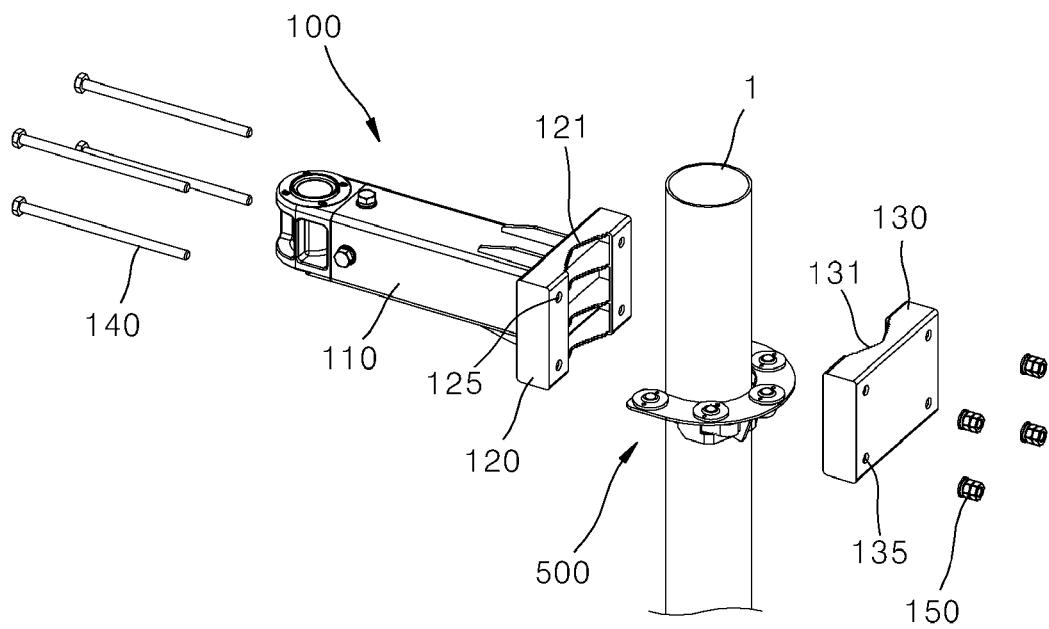
FIG. 4 is an exploded perspective view of FIG. 2.
Figure 5:
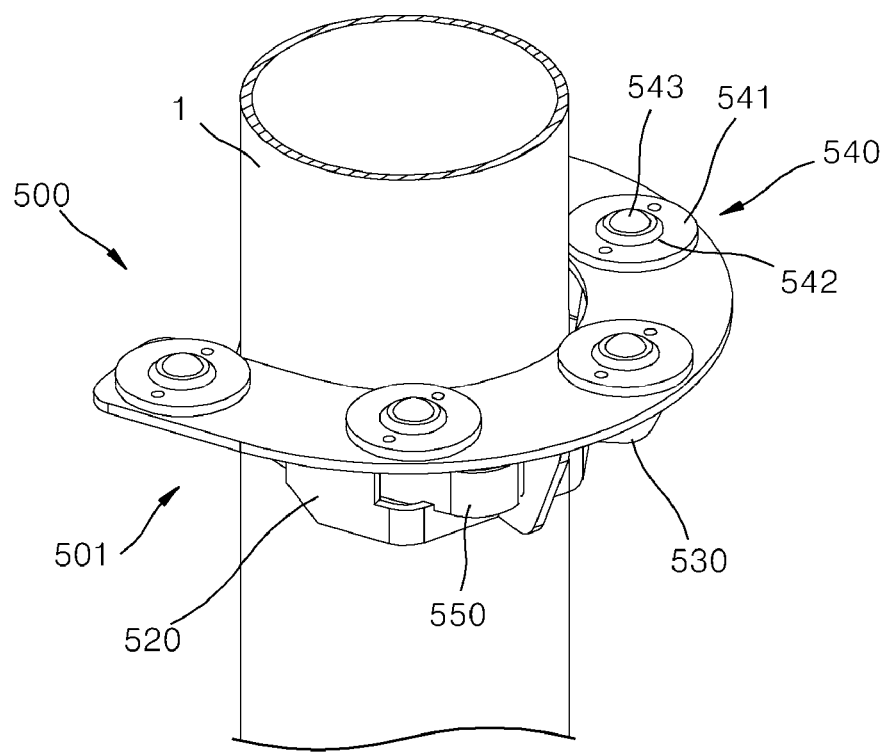
FIG. 5 is a perspective view illustrating the state in which a rotation assist mounting part among the elements of FIG. 1 has been installed in the support pole.
Figure 6:
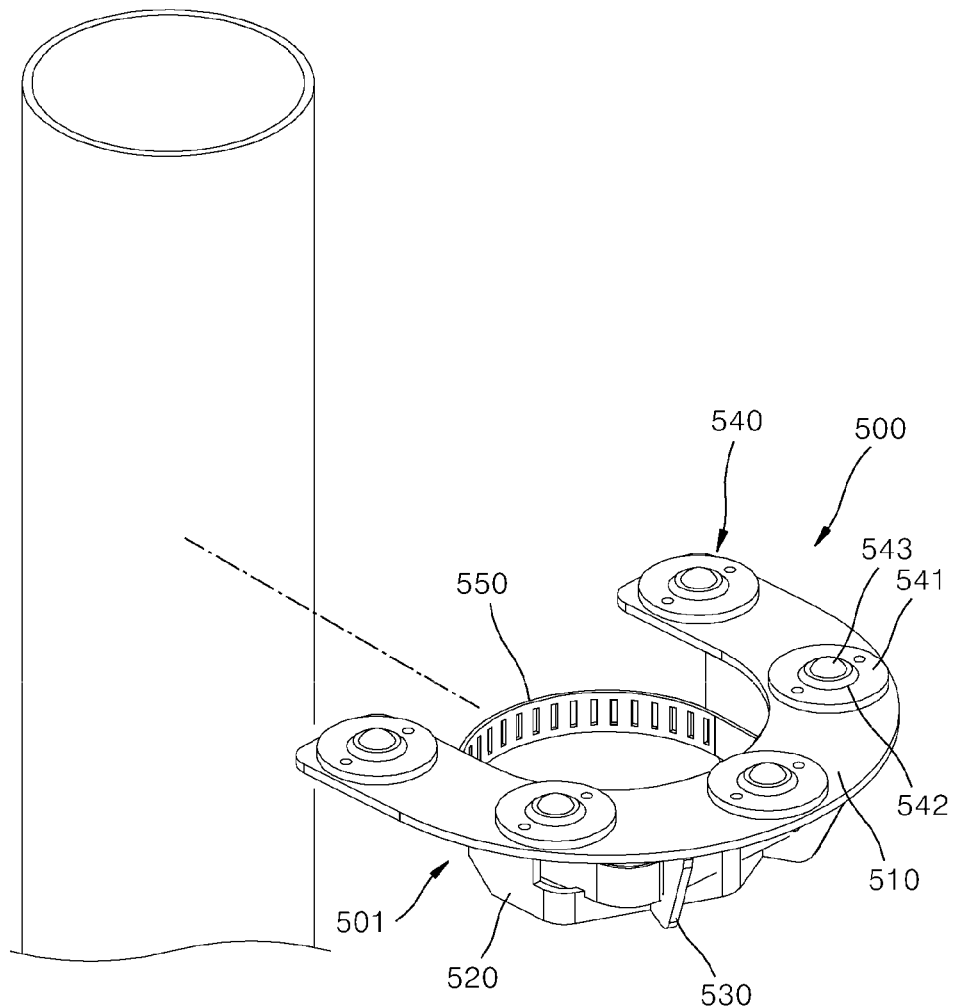
FIG. 6 is an exploded perspective view of FIG. 5.
Figure 7:
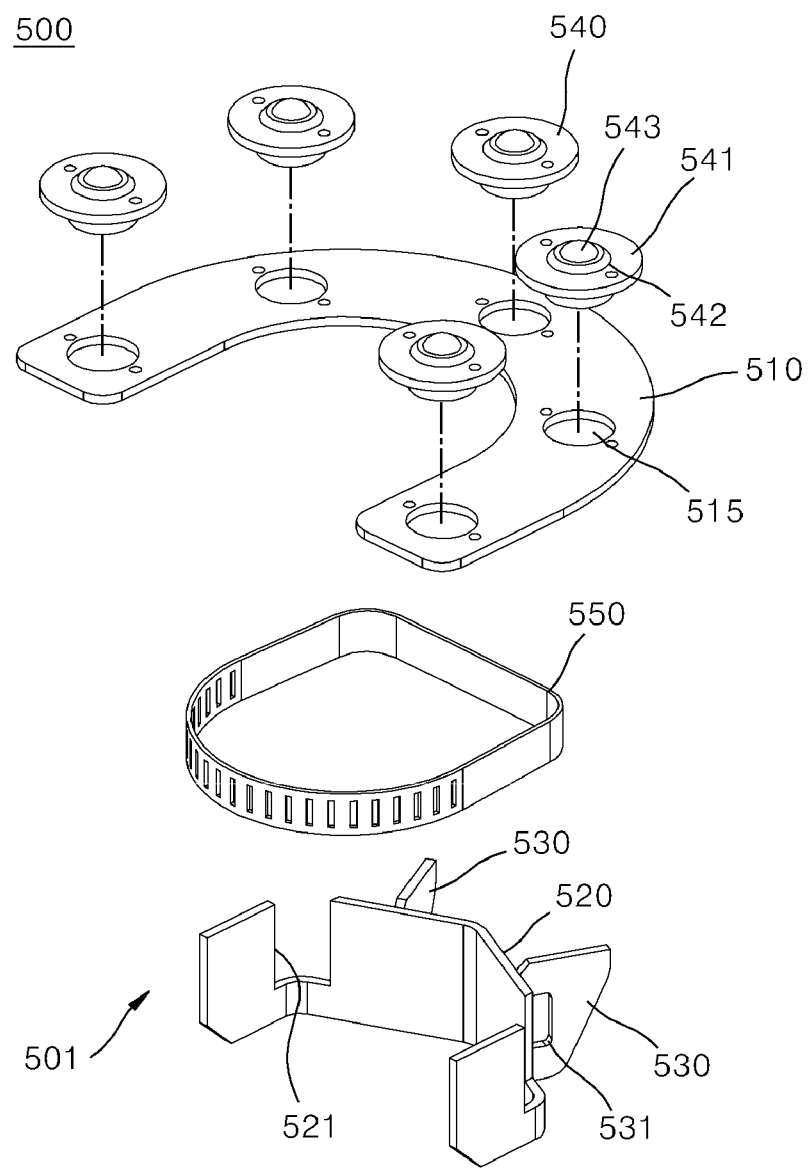
FIG. 7 is an exploded perspective view of the rotation assist mounting part in FIG. 6.
Figure 8:
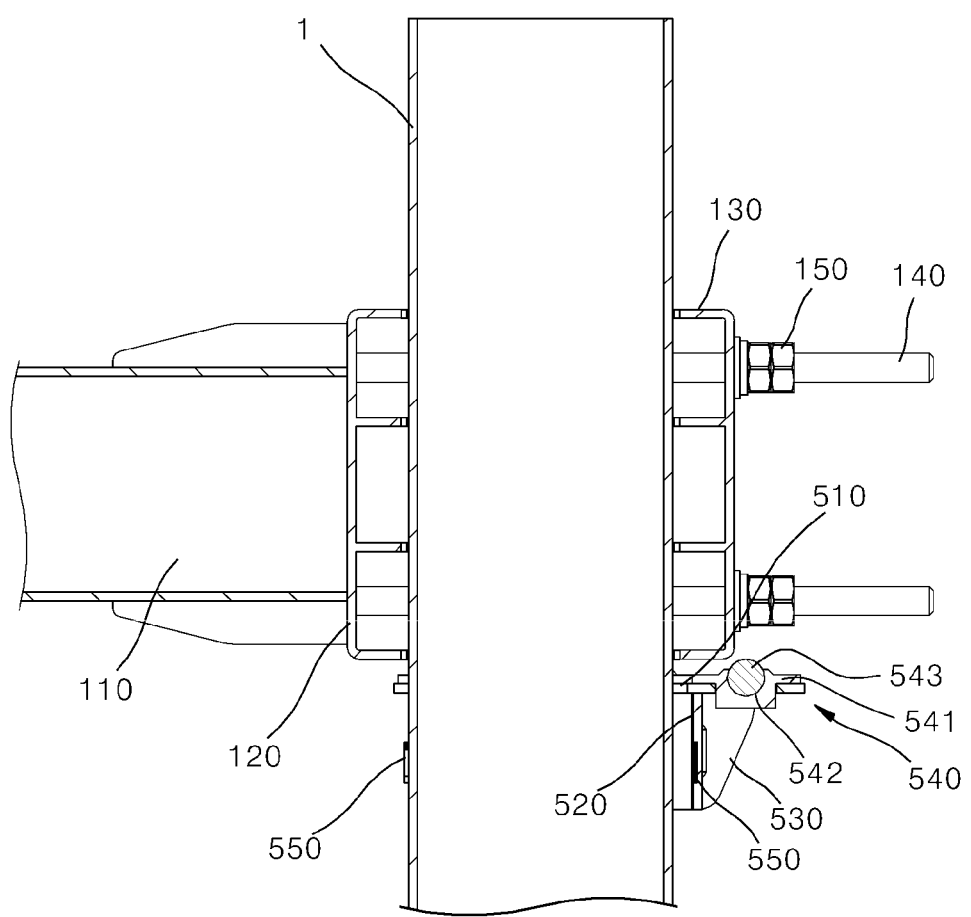
FIG. 8 is a part of a vertical cross section of FIG. 2.
Figure 9:
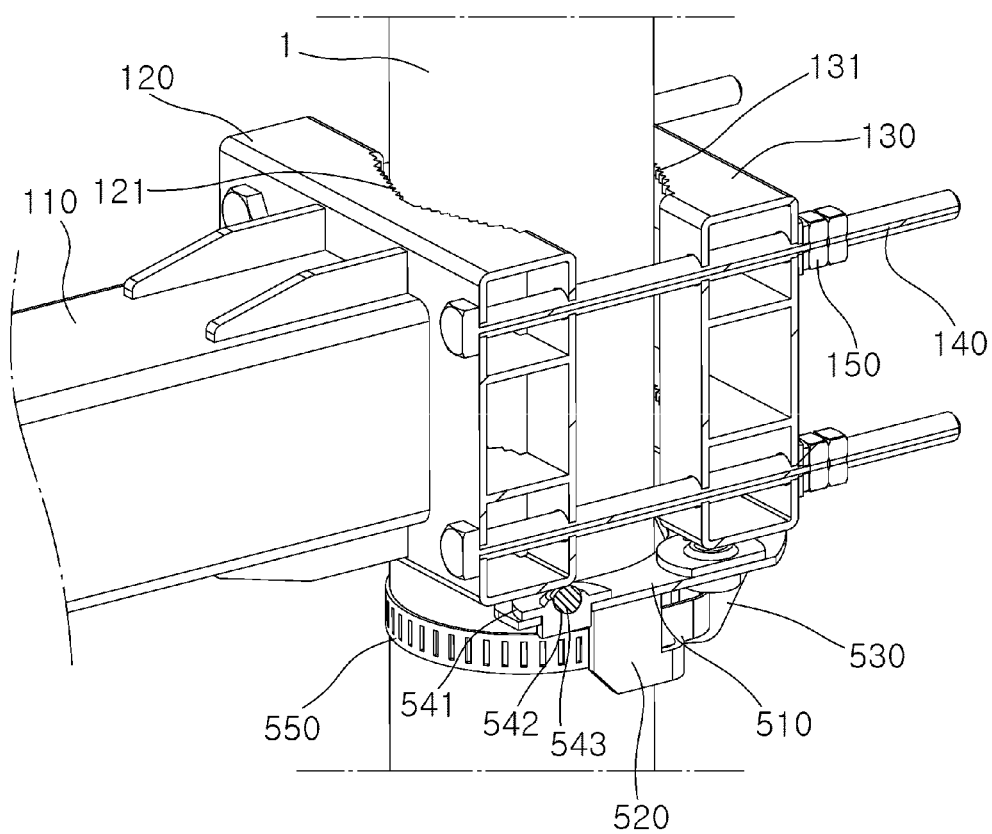
FIG. 9 is a cutaway perspective view illustrating a ball bearing assembly among the elements of FIG. 8.

FIG. 4 is an exploded perspective view of FIG. 2. FIG. 5 is a perspective view illustrating the state in which the rotation assist mounting part among the elements of FIG. 1 has been installed in the support pole. FIG. 6 is an exploded perspective view of FIG. 5. FIG. 7 is an exploded perspective view of the rotation assist mounting part in FIG. 6. FIG. 8 is a part of a vertical cross section of FIG. 2. FIG. 9 is a cutaway perspective view illustrating a ball bearing assembly among the elements of FIG. 8.

As reference is made to FIGS. 1 to 9, the rotation assist mounting part 500 is coupled on the support pole 1 corresponding to the bottom of the arm unit 100, and functions to support the installation of the arm unit 100 or the rotation thereof when a rotation angle of the arm unit 100 is adjusted.

More specifically, the rotation assist mounting part 500 may be provided to simultaneously support at least parts of the bottoms of the fixing type bracket 120 and separation type bracket 130 of the arm unit 100. As described above, the fixing type bracket 120 and separation type bracket 130 of the arm unit 100 are closely attached and disposed on one side and the other side of the outer circumference surface of the support pole 1, respectively, in a way to be isolated from each other at a given distance, and are coupled together by the fixing-long bolts 140 and the fixing nuts 150. In this case, it is preferred that the rotation assist mounting part 500 is provided to simultaneously support the bottoms of the fixing type bracket 120 and separation type bracket 130 isolated from each other.

To this end, the rotation assist mounting part 500 may be formed to have a size that covers at least a semicircle or more of the outer circumference surface of the support pole 1 on the premise that the support pole 1 has a pipe shape having a circular horizontal cross section. This is more specifically described in a descriptive part of the support panel part 501 among detailed elements of the rotation assist mounting part 500.

As reference is made to FIGS. 5 to 9, the rotation assist mounting part 500 may include a support panel part 501 supporting the weights of the arm unit 100, the clamping part 60 and the antenna device A, and a rotation support part 540 supporting the rotations of the fixing type bracket 120 and separation type bracket 130 of the arm unit 100.

The support panel part 501 functions to prevent the antenna device A or the arm unit 100 from downward dropping while one installer installs the antenna device A or the arm unit 100 in the support pole 1 by effectively supporting the weight of all the arm unit 100 and the clamping part 60 and the antenna device A installed therein by an operation of the support panel part 501 coming into contact with the bottoms of the fixing type bracket 120 and separation type bracket 130 of the arm unit 100.

Figure 10:
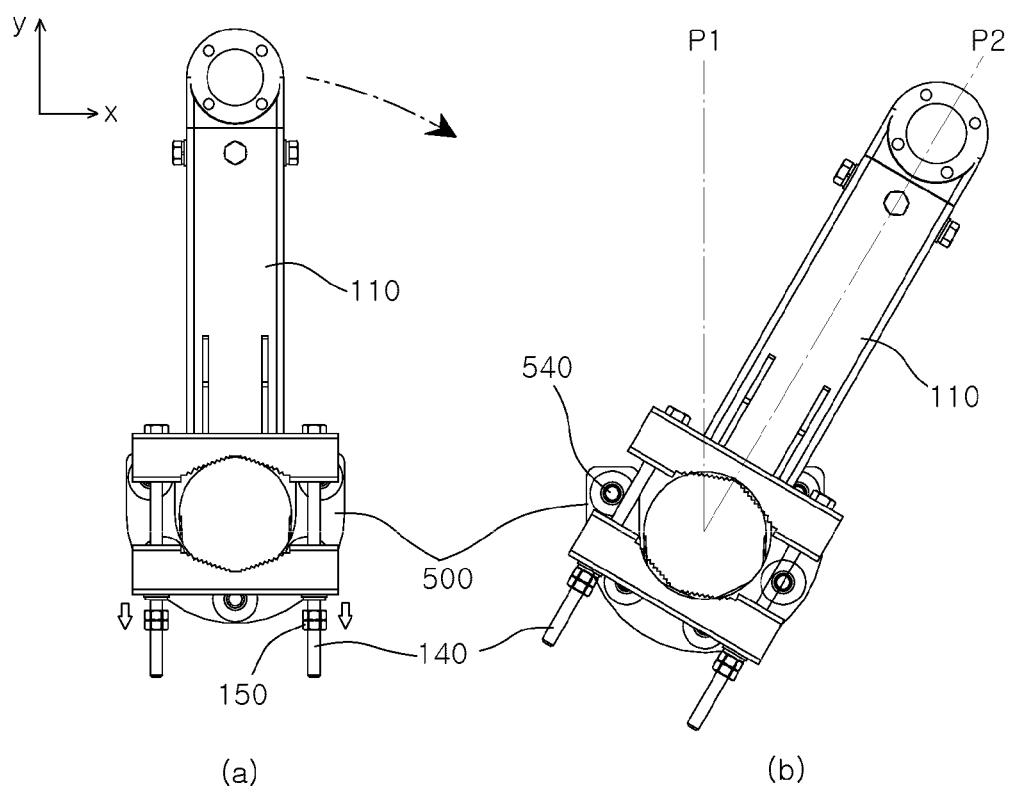
FIG. 10 is a plan view illustrating before and after the adjustment of directivity using the clamping apparatus for an antenna according to an embodiment of the present disclosure.

The rotation support part 540 functions to support the fixing type bracket 120 and separation type bracket 130 of the arm unit 100 so that the fixing type bracket 120 and the separation type bracket 130 are easily rotated toward one side and the other side thereof around the support pole 1 in order to adjust the directivity of the antenna device A in the state in which the fixing nuts 150 has been slightly loosed from the fixing-long bolts 140 coupling the fixing type bracket 120 and separation type bracket 130 of the arm unit 100 together (refer to FIG. 10(*a*)).

More specifically, as reference is made to FIGS. 6 to 9, the support panel part 501 may include a main support panel 510 having a horizontal surface so that the bottoms of the fixing type bracket 120 and separation type bracket 130 of the arm unit 100 are supported, a coupling panel 520 provided at the bottom of the main support panel 510 and having a surface attached to a part of the outer circumference surface of the support pole, and a sub-support panel 530 having a top supporting the bottom of the main support panel 510 and a side supporting the outside of the coupling panel 520.

After manufactured for each panel, the main support panel 510, the coupling panel 520 and the sub-support panel 530 may be integrated and provided through a welding coupling method and may be coupled for each panel through a screw coupling method.

The main support panel 510 may be provided as an approximately "U"-shaped horizontal panel having a side on which the arm unit 100 is provided opened, and may be firmly coupled with the support pole 1 by a fixing band 550 to be described later while covering one side of the outer circumference surface of the support pole 1.

In this case, it is preferred that both ends of the "U" shape of the main support panel 510 extend to have a size that covers at least a semicircle or more of the outer circumference surface of the support pole 1. Accordingly, parts of the bottoms of the fixing type bracket 120 and separation type bracket 130 of the arm unit 100, which are provided to be isolated from each other, can be simultaneously supported on the top of the main support panel 510.

A rotation part-seated hole 515 in which the rotation support part 540 is seated and installed may be formed in the main support panel 510 in a way to up and down penetrate through the main support panel 510. The rotation part-seated hole 515 may be in plural formed in the main support panel 510 in a way to be isolated from each other. The rotation support part 540 functioning to substantially support the bottoms of the fixing type bracket 120 and separation type bracket 130 of the arm unit 100 may be in plural seated in the rotation part-seated hole 515 and assembled therewith.

The coupling panel 520 may be provided as a vertical panel corresponding to an inner edge portion of the "U" shape of the main support panel 510, and may be firmly coupled with the support pole 1 along with the main support panel 510 by the fixing band 550 to be described later while covering one side of the outer circumference surface of the support pole 1 in a way to be closely attached thereto.

The coupling panel 520 may be coupled with the main support panel 510 by using any one of a welding coupling method and a screw coupling method in a way to be orthogonal to the main support panel 510. Furthermore, a band through hole 521 may be processed and formed in the coupling panel 520 so that the fixing band 550 to be described later penetrates the band through hole 521 and is installed therein while surrounding an outer circumference surface of the coupling panel 520 and the outer circumference surface of the support pole 1. As reference is made to FIG. 7, the band through hole 521 is provided in a groove form having a top opened, but is provided in a hole form through coupling with the main support panel 510. At least one band through hole 521 (two in an embodiment of the present disclosure) is provided, and is a portion through which the fixing band 550 to be described later penetrates the band through hole 521 from the outside to the inside thereof.

Meanwhile, the sub-support panel 530 may have a top provided to support the bottom of the main support panel 510 and a bottom provided to support the outside of the coupling panel 520. Such a sub-support panel 530 is provided to simultaneously support the main support panel 510 and the coupling panel 520 which are connected as an approximately "¬"-shaped vertical cross section, thus effectively supporting the gross weight of the arm unit 100, the clamping part 60 and the antenna device A, which is delivered through the arm unit 100 on the top of the sub-support panel 530.

A band accommodation hole 531 through which the fixing band 550 to be described later penetrates may be formed in the sub-support panel 530. As reference is made to FIG. 7, the band accommodation hole 531 is provided in a groove form opened toward the coupling panel 520, but is provided in a hole form through coupling with the coupling panel 520. At least one band accommodation hole 531 (two corresponding to the number of sub-support panels 530 in an embodiment of the present disclosure) is provided, and is a portion in which the fixing band 550 to be described later is accommodated between the sub-support panel and the outside of the coupling panel 520 and is penetrated.

Meanwhile, as reference is made to FIGS. 5 to 9, the rotation assist mounting part 500 may further include the fixing band 550 which fixes the coupling panel 520 to the support pole 1.

As reference is made to FIGS. 5 to 9, the fixing band 550 may be closely coupled with the outer circumference surface of the support pole 1 while surrounding a part of the outside of the coupling panel 520.

Furthermore, the fixing band 550 is provided in a flexible belt or band form, and has a circle or polygon type forming a closed loop. The fixing band 550 is coupled with the outer circumference surface of the coupling panel 520 and the outer circumference surface of the support pole 1 so that one side of the fixing band 550 is closely attached to the outer circumference surface of the coupling panel 520 through the band through hole 521 of the coupling panel 520 and the band accommodation hole 531 of the sub-support panel 530 and simultaneously the other side thereof is directly closely attached to the outer circumference surface of the support pole 1. Furthermore, after any part of the closed loop of the fixing band 550 is cut off and closely coupled with the outer circumference surfaces of the coupling panel 520 and the support pole 1 in a way to surround them, the fixing band 550 may attach or detach the entire support panel part 501 to or from the support pole 1 by an operation of locking or releasing the cut portion.

As reference is made to FIGS. 5 to 9, the rotation support part 540 may be provided as a plurality of ball bearing assemblies disposed in a way to protrude upward from the support panel part 501. As reference is made to FIGS. 5 to 9, the plurality of ball bearing assemblies may be disposed to be isolated from each other at a given distance in the circumferential direction of the support pole 1.

More specifically, as reference is made to FIGS. 5 to 9, the rotation support part 540 may include ball accommodation blocks 541 respectively seated in and fixed to the plurality of rotation part-seated holes 515 formed in the main support panel 510 of the support panel part 501 and bearing balls 543 accommodated in the ball accommodation holes 542 formed in the ball accommodation blocks 541, respectively, so that a part (the top) of the outer circumference surface of each of the bearing balls is exposed to the outside.

Although not illustrated, the ball accommodation blocks 541 may be firmly coupled with the rotation part-seated holes 515, respectively, through fastening members such as screws. The bearing ball 543 inserted into the ball accommodation hole 542 of the ball accommodation block 541 may be provided in a way to be rotatable within the ball accommodation hole 542.

Furthermore, although not illustrated, the ball bearing assembly may further include a lubricant which is coated on the inside of the ball accommodation hole 542 of the ball accommodation block 541 and reduces a frictional force when the bearing ball 543 rotates.

The top of the bearing ball 543 inserted into the ball accommodation hole 542 among the elements of the rotation support part 540 directly comes into contact with the bottoms of the fixing type bracket 120 and separation type bracket 130 of the arm unit 100, and functions to enable the arm unit 100 to smoothly rotate while effectively supporting the aforementioned gross weight as the rotation of the arm unit 100 is adjusted by an installer.

Meanwhile, the clamping apparatus for an antenna according to an embodiment of the present disclosure is described by adopting that the multiple ball bearing assemblies are provided in the main support panel 510, but may be implemented as another embodiment of a roller assembly including a support roller provided in the rotation part-seated hole 515 of the main support panel 510 in a way to rotate around a horizontal axis.

FIG. 10 is a plan view illustrating before and after the adjustment of directivity using the clamping apparatus for an antenna according to an embodiment of the present disclosure.

A process of installing the antenna device A or adjusting the directivity of the antenna device A by using the clamping apparatus for an antenna constructed as above according to an embodiment of the present disclosure is described in brief below.

First, as reference is made to FIG. 10, one installer closely attaches the coupling panel 520 of the elements of the rotation assist mounting part 500 to a part of the outer circumference surface of the support pole 1 at a given height of the support pole 1, then couples the fixing band 550 with the support pole 1 so that the fixing band 550 loosed in the state in which the fixing band 550 has penetrated the band through hole 521 of the coupling panel 520 and the band accommodation hole 531 of the sub-support panel 530 surrounds the outer circumference surface of the support pole 1, and then fixes the rotation assist mounting part 500 to the support pole 1 in a way to be fixed thereto by a given tightening force.

Next, the one installer temporarily fixes the fixing type bracket 120 and separation type bracket 130 of the arm unit 100 to the outer circumference surface of the support pole 1 corresponding to the top of the rotation assist mounting part 500 by using the fixing-long bolts 140 and the fixing nuts 150.

In this case, as reference is made to FIG. 10, the one installer rotates directivity of the antenna device A to be installed later within a wide range to a location where the arm unit 100 will be fixed, based on a pre-predicted or setting value. In this case, as reference is made to FIG. 10(a), the one installer may adjust antenna directivity within the wide range as reference is made to FIG. 10(b) in the state in which the fixing nuts 150 of the fixing-long bolts 140 that fasten and penetrate the fixing type bracket 120 and separation type bracket 130 of the arm unit 100 have been released to some extent.

In this case, the rotation assist mounting part 500 is provided to support the weight of the arm unit 100 and simultaneously support the rotation of the arm unit 100, thereby facilitating installation by one installer even without multiple installers.

Next, the clamping part 60 (the common coupling unit 200 if the common coupling unit 200 is provided) is coupled with the front end of the arm unit 100, and the antenna device A is fixed to the front end of the tilting unit 400 of the clamping part.

Finally, even after the antenna device A is installed in the clamping apparatus for an antenna according to an embodiment of the present disclosure, if it is necessary to generally rotate the arm unit 100 around the support pole 1 in order to adjust the directivity of the antenna device A, the one installer can perform stable rotation and adjustment through the rotation assist mounting part 500 in the state in which the fixing nuts 150 have been slightly loosed from the fixing-long bolts 140 that couple the fixing type bracket 120 and separation type bracket 130 of the arm unit 100 together.

The clamping apparatus for an antenna according to an embodiment of the present disclosure has been described above in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the clamping apparatus for an antenna in which the directivity of the antenna device can be easily adjusted by one installer because the rotation of the entire arm unit with which the antenna device has been coupled is provided to be supported on the support pole.

The invention claimed is:

1. A clamping apparatus for an antenna comprising:
an arm unit configured to couple with and extend horizontally from a vertical support pole;
a clamping part having one end coupled with a front end of the arm unit and another end configured to connect to an antenna device so as to be left and right rotatable or to be up and down tiltable, and configured to rotate the antenna device; and
a rotation assist mounting part configured to attach to the support pole corresponding to a bottom of the arm unit and configured to rotatably support the arm unit in a rotation direction of the arm unit while supporting a weight of the arm unit and the antenna device when a rotation angle of the arm unit is changed,
wherein the arm unit comprises:
a fixing type bracket integrated and provided at an end of an arm main body and is configured to be disposed in contact with an outer circumference surface of the support pole; and
a separation type bracket configured to be disposed in contact with the outer circumference surface of the support pole on a side opposite to the fixing type bracket with respect to the support pole and coupled with the fixing type bracket by multiple fixing-long bolts and fixing nuts,
wherein the rotation assist mounting part comprises:
a support panel part configured to support a weight of the arm unit, the clamping part and the antenna device; and
a rotation support part configured to support the rotation of the arm unit,
wherein the support panel part comprises:
a main support panel which has a horizontal surface so that bottom surfaces of the fixing type bracket and separation type bracket of the arm unit are simultaneously supported; and
a coupling panel provided at a bottom of the main support panel and has a surface which is configured to be in contact with a part of the outer circumference surface of the support pole,
wherein the main support panel is a "U"-shaped panel that comprises two substantially parallel straight legs, each having a distal end configured to be positioned beneath the fixing type bracket, and a semicircular portion that integrally connects the two legs and is configured to be positioned beneath the separation bracket, forming a cavity configured to enclose a full radius of the support pole.

2. The clamping apparatus of claim 1, wherein the arm main body is configured to extend in a given length in a horizontal direction on any one of a first side and a second side of the support pole.

3. The clamping apparatus of claim 1, further comprising:
a sub-support panel comprising a top supporting the bottom of the main support panel and a side supporting an outside of the coupling panel.

4. The clamping apparatus of claim 3, wherein the sub-support panel is provided in plural along an outer circumference of the coupling panel.

5. The clamping apparatus of claim 3, wherein the rotation assist mounting part further comprises a fixing band configured to fix the coupling panel to the support pole.

6. The clamping apparatus of claim 5, wherein the fixing band is configured to be in contact with the outer circumference surface of the support pole while surrounding a part of the outside of the coupling panel.

7. The clamping apparatus of claim 5, wherein the fixing band is configured to be coupled with the coupling panel and the support pole by using any one of a welding coupling method and a fastening method.

8. The clamping apparatus of claim 5, wherein:
at least one band through hole through which the fixing band penetrates from an outside of the coupling panel to an inside thereof is formed in the coupling panel, and
at least one band accommodation hole in which the fixing band is accommodated between the sub-support panel and the outside of the coupling panel is formed in the sub-support panel.

9. The clamping apparatus of claim 3, wherein the rotation support part comprises a plurality of ball bearing assemblies disposed to protrude upward from the support panel part and configured to be isolated from each other at a given distance in a circumferential direction of the support pole.

10. The clamping apparatus of claim 9, wherein the ball bearing assembly comprises:
ball accommodation blocks seated in and fixed to rotation part-seated holes, respectively, formed in plural in the main support panel of the support panel part; and
bearing balls accommodated in the ball accommodation holes formed in the ball accommodation blocks, respectively, so that a part of an outer circumference surface of each of the bearing balls is exposed to an outside.

11. The clamping apparatus of claim 10, wherein the ball bearing assembly further comprises a lubricant coated on an inside of the ball accommodation hole and configured to reduce a frictional force when the bearing ball rotates.

12. The clamping apparatus of claim 10, wherein the rotation part-seated holes in which the ball accommodation blocks are seated and assembled are formed in the main support panel in a way to up and down penetrate the main support panel.

* * * * *